US007514484B2

(12) United States Patent
Hoshikawa et al.

(10) Patent No.: US 7,514,484 B2
(45) Date of Patent: Apr. 7, 2009

(54) AQUEOUS DISPERSION OF POLYTETRAFLUOROETHYLENE AND PROCESS FOR ITS PRODUCTION

(75) Inventors: Jun Hoshikawa, Ichihara (JP); Shinya Higuchi, Ichihara (JP); Yasuhiko Matsuoka, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 226 days.

(21) Appl. No.: 11/414,400

(22) Filed: May 1, 2006

(65) Prior Publication Data
US 2006/0276574 A1 Dec. 7, 2006

(30) Foreign Application Priority Data
Jun. 6, 2005 (JP) ............................. 2005-165054

(51) Int. Cl.
*C08F 1/00* (2006.01)
(52) U.S. Cl. .................. 523/310; 210/662; 524/544; 526/243; 554/191
(58) Field of Classification Search ............... 523/310; 524/544; 554/191; 526/243; 210/662
See application file for complete search history.

(56) References Cited

U.S. PATENT DOCUMENTS

| 4,369,266 | A | 1/1983 | Kuhls et al. | |
|---|---|---|---|---|
| 6,498,207 | B1 | 12/2002 | Hoshikawa et al. | |
| 6,825,250 | B2 * | 11/2004 | Epsch et al. ............... | 523/310 |
| 6,833,403 | B1 * | 12/2004 | Bladel et al. .............. | 524/458 |
| 6,861,466 | B2 * | 3/2005 | Dadalas et al. ............ | 524/544 |
| 2005/0004318 | A1 * | 1/2005 | Ohshiro et al. ........... | 525/329.1 |
| 2005/0038177 | A1 | 2/2005 | Hoshikawa et al. | |
| 2005/0189299 | A1 * | 9/2005 | Malvasi et al. ............ | 210/663 |
| 2006/0128872 | A1 * | 6/2006 | Zipplies et al. ............ | 524/545 |
| 2006/0135654 | A1 * | 6/2006 | Swearingen et al. ...... | 523/310 |
| 2006/0175261 | A1 * | 8/2006 | Noelke et al. ............. | 210/662 |
| 2006/0183842 | A1 * | 8/2006 | Johnson .................... | 524/544 |
| 2006/0276574 | A1 | 12/2006 | Hoshikawa et al. | |
| 2007/0015864 | A1 | 1/2007 | Hintzer et al. | |

FOREIGN PATENT DOCUMENTS

| JP | 55-120630 | 9/1980 |
|---|---|---|
| JP | 2000-198899 | 7/2000 |
| JP | 2003-119204 | 4/2003 |
| JP | 2005-8775 | 1/2005 |
| WO | WO 00/35971 | 6/2000 |
| WO | WO 03/020836 A1 | 3/2003 |
| WO | WO 03/078479 A1 | 9/2003 |

OTHER PUBLICATIONS

Handbook of Fluorine Resins, edited by Takaomi Satokawa, published by Nikkankogyo Shimbun, 1990, pp. 28-29.
Takeshi Suwa, et al., "Melting and Crystallization Behavior of Poly(tetrafluoroethylene). New Method for Molecular Weight Measurement of Poly(tetrafluoroethylene) Using a Differential Scanning Calorimeter", Journal of Applied Polymer Science, vol. 17, 1973, pp. 3253-3257.
Handbook of Fluorine Resins, edited by Takaomi Satokawa, published by Nikkankogyo Shimbun, 1990, pp. 32-33.
U.S. Appl. No. 11/414,400, filed May 1, 2006, Hoshikawa, et al.
U.S. Appl. No. 11/282,625, filed Nov. 21, 2005, Hoshikawa, et al.
U.S. Appl. No. 11/776,848, filed Jul. 12, 2007, Hoshikawa, et al.
U.S. Appl. No. 12/104,680, filed Apr. 17, 2008, Higuchi, et al.
U.S. Appl. No. 12/106,515, filed Apr. 21, 2008, Hoshikawa, et al.

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, P.C.

(57) ABSTRACT

To obtain a high concentration aqueous PTFE dispersion containing PTFE at a concentration of from 60 to 75 mass % by dissolving from 0.001 to 0.1 mass %, based on the mass of PTFE, of a specific carboxylic acid salt such as ammonium laurate in a low concentration aqueous dispersion of polytetrafluoroethylene (PTFE) comprising from 1 to 40 mass % of PTFE fine particles, from 0.0001 to 0.02 mass %, based on the mass of PTFE, of a specific fluorine-containing carboxylic acid type emulsifier (for example, ammonium perfluorooctanoate), and from 1 to 20 mass %, based on the mass of PTFE, of a specific nonionic surfactant, and then concentrating the low concentration aqueous dispersion of PTFE. The present invention provides a process for producing a high concentration aqueous PTFE dispersion containing PTFE at a high concentration by using, as a starting material, a low concentration aqueous dispersion of PTFE containing a fluorine-containing carboxylic acid type emulsifier (PFCA) at a low concentration, and an aqueous PTFE dispersion obtained from the high concentration aqueous PTFE dispersion.

10 Claims, No Drawings

AQUEOUS DISPERSION OF POLYTETRAFLUOROETHYLENE AND PROCESS FOR ITS PRODUCTION

The present invention relates to an aqueous dispersion of polytetrafluoroethylene (hereinafter referred to as PTFE) and a process for its production.

An emulsion polymerized PTFE is obtained by polymerizing a tetrafluoroethylene (hereinafter referred to as TFE) monomer, in the presence of pure water, a polymerization initiator, a fluorine-containing carboxylic acid salt emulsion (hereinafter referred to as PFCA) and a paraffin wax stabilizer, and it is obtained as an aqueous PTFE polymer emulsion containing PTFE fine particles (Handbook of Fluorine resins, p. 28, edited by Takaomi Satokawa, published by Nikkankogyo Shimbun).

The aqueous PTFE polymer emulsion after the polymerization is used as a low concentration aqueous PTFE dispersion after blended with a nonionic surfactant, or as a high concentration aqueous PTFE dispersion after concentration. Otherwise, it is used as an aqueous PTFE dispersion after blended with a nonionic surfactant, a filler or other known components as the case requires.

However, it has not been industrially common to remove PFCA from an aqueous PTFE dispersion.

As PFCA is hardly naturally degradable, it is preferred to minimize the PFCA content in products.

As a method for lowering the PFCA content, for example, a method has been proposed wherein the PFCA content in an aqueous PTFE dispersion is lowered by adding a specific amount of water and a specific nonionic surfactant to an aqueous PTFE polymer emulsion, and repeating concentration a plurality of times (WO03/078479). However, in a case where the PFCA content is low in the aqueous PTFE dispersion, it is difficult to concentrate PTFE particles in the concentration process of such a low concentration aqueous PTFE dispersion. Especially when the PFCA concentration is less than 200 ppm based on the mass of PTFE, the concentration rate tends to be extremely low, and there has been a problem that a high concentration aqueous PTFE dispersion having a high PTFE concentration cannot be obtained after the concentration.

Further, a method has been proposed wherein an aqueous PTFE dispersion with a low PFCA concentration is obtained by using an ion exchange resin (WO00/35971), but the aqueous PTFE dispersion having the PFCA concentration actually lowered, has had a problem of poor friction stability. Under friction or shearing, an aqueous PTFE dispersion tends to get less homogeneous, because the PTFE fine particles fibrillate and form agglomerates. Therefore, an aqueous PTFE dispersion having the PFCA concentration lowered, tends to have poor friction stability and is likely to clog a feed pump or form an uneven or defective coating containing agglomerates.

Further, a method has been proposed wherein the viscosity of a liquid is adjusted by adding an anionic surfactant having an acid functional group having a pKa of at most 4 (WO03/020836). However, when sodium lauryl sulfate, which is a sulfur-containing anionic surfactant given as an example therein, is used, a coating tends to be colored yellowish brown during baking, and a sulfate remains as an ionic impurity in the coating after baking. Therefore, it is not suitable for applications to electronic materials such as printed circuit boards.

It is an object of the present invention to provide a process for obtaining a high concentration PTFE aqueous dispersion having a high PTFE concentration from a low concentration PTFE aqueous dispersion having a low PFCA concentration. Further, it is another object of the present invention to provide an aqueous PTFE dispersion which is less susceptible to coloration of a coating during baking, is free from causing problematic ionic impurities and is excellent friction stability.

The present inventors conducted extensive studies to solve the above-mentioned problems and, as a result, have found that a high concentration PTFE aqueous dispersion having a high PTFE concentration can be obtained by adding a specific carboxylic acid salt to a low concentration PTFE aqueous dispersion and concentrating it, even from a low concentration PTFE aqueous dispersion having a low PFCA concentration as a starting material. Further, they have found that an aqueous PTFE dispersion obtained from the high concentration PTFE aqueous dispersion is less susceptible to coloration of a coating during baking, is free from causing problematic ionic impurities, and is excellent in friction stability. The present invention has been accomplished on the basis of these discoveries.

Namely, the present invention provides an aqueous PTFE dispersion comprising from 55 to 70 mass % of PTFE fine particles having an average particle diameter of from 0.1 to 0.5 μm, from 0.0001 to 0.02 mass %, based on the mass of PTFE, of a fluorine-containing carboxylic acid salt represented by the formula (1), from 1 to 20 mass %, based on the mass of PTFE, of a nonionic surfactant represented by the formula (2) and/or the formula (3), and from 0.001 to 0.10 mass %, based on the mass of PTFE, of a carboxylic acid salt represented by the formula (4):

formula (1): $R^1$—COOX (wherein $R^1$ is a $C_{5-9}$ alkyl group having fluorine atoms substituted for from 90 to 100% of the hydrogen atoms (which may contain from 1 to 2 etheric oxygen atoms), and X is an ammonium ion);

formula (2): $R^2$—O-A-H (wherein $R^2$ is a $C_{8-18}$ alkyl group, and A is a polyoxyalkylene chain consisting of from 5 to 20 oxyethylene groups and from 0 to 2 oxypropylene groups);

formula (3): $R^3$—$C_6H_4$—O—B—H (wherein $R^3$ is a $C_{4-12}$ alkyl group, and B is a polyoxyethylene chain consisting of from 5 to 20 oxyethylene groups); and formula (4): $R^4$—COOY (wherein $R^4$ is a $C_{6-16}$ alkyl group, alkenyl group or aryl group having fluorine atoms substituted for at most 20% of the hydrogen atoms, and Y is a cationic group represented by the formula $\{HO(CH_2)_n\}_x N^+ H_{4-x}$ wherein n is an integer of from 2 to 4, and x is an integer of from 0 to 4).

Further, the present invention provides a process for producing an aqueous PTFE dispersion, which comprises dissolving from 0.001 to 0.10 mass %, based on the mass of PTFE, of a carboxylic acid salt represented by the formula (4) in a low concentration aqueous PTFE dispersion comprising from 1 to 40 mass % of PTFE fine particles having an average particle size of from 0.1 to 0.5 μm, from 0.0001 to 0.02 mass %, based on the mass of PTFE, of a fluorine-containing carboxylic acid salt represented by the formula (1), and from 1 to 20 mass %, based on the mass of PTFE, of a nonionic surfactant represented by the formula (2) and/or the formula (3), and then concentrating the low concentration aqueous PTFE dispersion to give a high concentration aqueous PTFE dispersion containing PTFE at a concentration of from 60 to 75 mass %.

According to the present invention, a high concentration aqueous PTFE dispersion can be obtained easily through a process step for producing an aqueous PTFE dispersion having a lowered PFCA concentration. Further, the aqueous PTFE dispersion obtained has excellent friction stability, and baked products obtained from the aqueous PTFE dispersion are free from problems such as coloration and ionic impurities.

In the aqueous PTFE dispersion of the present invention, PTFE fine particles having an average particle diameter of from 0.10 to 0.50 μm, preferably from 0.15 to 0.40 μm, particularly preferably from 0.20 to 0.35 μm, obtained by emulsion polymerization are used. If the average particle diameter is smaller than 0.10 μm, the PTFE has a low molecular weight and is mechanically weak, and if the average particle diameter is larger than 0.50 μm, PTFE fine particles tend to sediment so fast that the storage stability deteriorates.

The average molecular weight of PTFE is preferably from 500,000 to 30,000,000, particularly preferably from 1,000,000 to 25,000,000, though it can be selected arbitrary. If the average molecular weight is smaller than 500,000, such PTFE is mechanically weak, and PTFE having an average molecular weight larger than 30,000,000 is difficult to produce industrially.

The average molecular weight is calculated from the heat of crystallization by the method of Suwa et al. (Journal of Applied Polymer Science, 17, 3253 (1973)).

In the present invention, PTFE includes not only a homopolymer of TFE, but also so-called modified PTFE containing polymerized units derived from a comonomer component copolymerizable with TFE, for example, a halogenated ethylene such as chlorotrifluoroethylene, a halogenated propylene such as hexafluoropropylene or a fluorovinyl ether such as a perfluoro(alkyl vinyl ether), in such a small amount that melt-processing is substantially impossible.

The PTFE fine particles are preferably obtained as an aqueous PTFE polymer emulsion by polymerizing the TFE monomer injected under a pressure of from 2 to 50 atm, in the presence of pure water, a peroxide type polymerization initiator, PFCA and a paraffin wax stabilizer. The PTFE concentration in the aqueous PTFE polymer emulsion is from 1 to 40 mass %, preferably from 10 to 40 mass %, more preferably from 15 to 35 mass %, particularly preferably from 20 to 30 mass %. If the PTFE concentration is lower than 1 mass %, concentration takes time and energy, and if the PTFE concentration is higher than 40 mass %, the product yield can be low due to agglomeration of PTFE fine particles.

PFCA to be used in the present invention is represented by the formula (1).

Formula (1): $R^1$—COOX (wherein $R^1$ is a $C_{5-9}$ alkyl group having fluorine atoms substituted for from 90 to 100% of the hydrogen atoms (which may contain from 1 to 2 etheric oxygen atoms), and X is an ammonium ion)

Specific examples of PFCA of the formula (1) include e.g. $C_7F_{15}COONH_4$, $HC_7F_{14}COONH_4$, $C_6F_{13}COONH_4$, $HC_6F_{12}COONH_4$, $C_8F_{17}COONH_4$, $C_4F_9OC_2F_4OCF_2COONH_4$ and $C_2F_5OC_2F_4OCF_2COONH_4$, but $C_7F_{15}COONH_4$ (ammonium perfluorooctanoate) is most preferred, since it stabilizes the polymerization process.

PFCA of the formula (1) is preferably used in an amount of from 0.05 to 1.0 mass %, more preferably from 0.1 to 0.5 mass %, particularly preferably from 0.15 to 0.3 mass %, based on the mass of PTFE to be produced, when the TFE monomer is polymerized.

If PFCA of the formula (1) is used in an amount of less than 0.05 mass % based on the mass of PTFE, the product yield is low due to agglomeration of PTFE fine particles, and if the amount is larger than 1.0 mass %, PTFE is hardly obtained in the form of fine particles.

The nonionic surfactant to be used in the present invention is represented by the formula (2) and/or the formula (3).

Formula (2): $R^2$—O—A—H (wherein $R^2$ is a $C_{8-18}$ alkyl group, and A is a polyoxyalkylene chain consisting of from 5 to 20 oxyethylene groups and from 0 to 2 oxypropylene groups)

Formula (3): $R^3$—$C_6H_4$—O—B—H (wherein $R^3$ is a $C_{4-12}$ alkyl group, and B is a polyoxyalkylene chain consisting of from 5 to 20 oxyethylene groups)

In the formula (2), the alkyl group as $R^2$ has a carbon number of from 8 to 18, preferably from 10 to 16, particularly preferably from 12 to 16. If the carbon number is larger than 18, the surfactant has a high pour point and is difficult to handle, and the PTFE aqueous dispersion tends to have poor storage stability because the PTFE fine particles readily sediment when the PTFE aqueous dispersion is left to stand for a long time. If the carbon number is smaller than 8, the PTFE aqueous dispersion has a high surface tension and has poor wettability when applied to form a coating.

In the formula (2), the hydrophilic group A is a polyoxyalkylene chain consisting of from 5 to 20 oxyethylene groups and from 0 to 2 oxypropylene groups, preferably consisting of from 7 to 12 oxyethylene groups and from 0 to 2 oxypropylene groups, in view of viscosity and stability. Especially, it is preferred that the hydrophilic group A has from 0.5 to 1.5 oxypropylene groups because the defoaming property is good.

In the formula (3), the alkyl group as $R^3$ has a carbon number of from 4 to 12, preferably from 6 to 10, particularly preferably from 8 to 9. If the alkyl group has a carbon number smaller than 4, the PTFE aqueous dispersion has a high surface tension and has poor wettability, and if the carbon number is larger than 12, the PTFE aqueous dispersion tends to have poor storage stability because the PTFE fine particles readily sediment when the PTFE aqueous dispersion is left to stand for a long time.

In the formula (3), the hydrophilic group B is a polyoxyalkylene chain consisting of from 5 to 20 oxyethylene groups, preferably consisting of from 6 to 16 oxyethylene groups, particularly preferably from 7 to 12 oxyethylene groups, in view of viscosity and stability.

The nonionic surfactant of the formula (2) or the formula (3) preferably has an average molecular weight of from 450 to 800, more preferably from 500 to 750, particularly preferably from 550 to 700. A surfactant having an average molecular weight larger than 800 is not preferred because it would have a high pour point and would be difficult to handle. A surfactant having an average molecular weight smaller than 450 is not preferred either, because the PTFE aqueous dispersion would have poor wettability when applied to form a coating.

Specific examples of the nonionic surfactant of the formula (2) include nonionic surfactants having molecular structures such as $C_{13}H_{27}$—$(OC_2H_4)_{10}$—OH, $C_{12}H_{25}$—$(OC_2H_4)_{10}$—OH, $C_{10}H_{21}CH(CH_3)CH_2$—$(OC_2H_4)_9$—OH, $C_{13}H_{27}$—$(OC_2H_4)_9$—$OCH(CH_3)CH_2$—OH, $C_{16}H_{33}$—$(OC_2H_4)_{10}$—OH and $HC(C_5H_{11})(C_7H_{15})$—$(OC_2H_4)_9$—OH, and commercial products such as the TERGITOL (registered trademark) 15 S series manufactured by Dow Chemical Company and the LIONOL (registered trademark) TD series manufactured by Lion Corporation.

Specific examples of the nonionic surfactant of the formula (3) include nonionic surfactants having molecular structures such as $C_8H_{17}$—$C_6H_4$—$(OC_2H_4)_{10}$—OH and $C_9H_{19}$—$C_6H_4$—$(OC_2H_4)_{10}$—OH, and commercial products such as the Triton (registered trademark) X series manufactured by Dow and the NIKKOL (registered trademark) OP and NP series manufactured by Nikko Chemicals Co., Ltd.

Nonionic surfactants of the formula (2) and/or the formula (3) may be used singly or in combination of two or more.

Since a nonionic surfactant is a mixture of at least two substances having different molecular structures, the carbon number of the alkyl groups and the numbers of the oxyethylene groups and oxypropylene groups in the polyoxyalkylene chain in a nonionic surfactant are averaged out herein and, therefore, may not be integers.

In the present invention, the nonionic surfactant is added to an aqueous PTFE polymer emulsion to secure stability during the process and added to a high concentration aqueous PTFE dispersion after concentration to adjust the physical properties and attain the viscosity and wettability suitable for the intended use.

The nonionic surfactant is added to the aqueous PTFE polymer emulsion in an amount of preferably from 1 to 20 mass %, more preferably from 2.0 to 16 mass %, based on the mass of PTFE. If such an amount is less than 1 mass %, the effect of stabilizing of the aqueous PTFE polymer emulsion is small, and if it is more than 20 mass %, the concentration of the nonionic surfactant which is present in the supernatant produced during the concentration and disposed, is high, such being uneconomical.

The low concentration aqueous PTFE dispersion to be used in the present invention is obtainable by stabilizing an aqueous PTFE polymer emulsion with a nonionic surfactant and reducing the PFCA concentration to 0.0001 to 0.02 mass % by a known method disclosed in e.g. WO03/078479, WO00/35971 or JP-A-55-120630.

The PFCA concentration in the low concentration aqueous PTFE dispersion is preferably from 0.001 to 0.02 mass %, based on the mass of PTFE. It is industrially difficult to attain a PFCA concentration lower than 0.001 mass %, and a PFCA concentration higher than 0.02 mass % is unfavorable in view of environmental influences.

In the process for producing the aqueous PTFE dispersion of the present invention, in order to improve the concentration efficiency of a low concentration aqueous PTFE dispersion having a low PFCA concentration, the carboxylic acid salt represented by the formula (4) is added to and dissolved in the low concentration aqueous PTFE dispersion. The reason is not clearly understood, but if the carboxylic acid salt represented by the formula (4) is added before the concentration, the concentration efficiency is improved, whereby it is possible to readily obtain a high concentration aqueous PTFE dispersion having a PTFE concentration of 60 to 75 mass %. If the carboxylic acid salt represented by the formula (4) is not added, the PTFE concentration after the concentration hardly tends to be high.

Formula (4): $R^4$—COOY (wherein $R^4$ is a $C_{6-16}$ alkyl group, alkenyl group or aryl group having fluorine atoms substituted for at most 20% of the hydrogen atoms, and Y is a cationic group represented by the formula $\{HO(CH_2)_n\}_x N^+ H_{4-x}$ wherein n is an integer of from 2 to 4, and x is an integer of from 0 to 4)

In the formula (4), the alkyl group or alkenyl group as $R^4$ may be linear or branched, may be primary, secondary or tertiary, and may have a benzene ring. Further, in the formula (4), the aryl group as $R^4$ may have an alkyl group at an ortho-position, meta-position, para-position or a plurality of these positions. The alkyl group, alkenyl group or aryl group has a carbon number of from 6 to 16, more preferably from 6 to 15, particularly preferably from 6 to 12. If the carbon number is smaller than 6, the effect of accelerating the concentration during concentration will be weak. If the carbon number is larger than 16, such a carboxylic acid salt can hardly be dissolved, and may be precipitated by a change of the pH.

Further, the compound represented by the formula (4) may be a mixture of ones having alkyl groups, alkenyl groups or aryl groups having different carbon numbers, and in such a case, the carbon number of $R^4$ indicates the number average value.

Further, in the alkyl group, alkenyl group or aryl group of $R^4$, at most 20% of the hydrogen atoms may be replaced by fluorine atoms. If environmental influences are taken into consideration, it is undesirable that more than 20% of them are replaced by fluorine atoms.

As a specific example of Y, a cation selected from an ammonium ion, an ethanolamine ion, a diethanolamine ion and a triethanolamine ion is preferred, and an ammonium ion is particularly preferred, since it can be removed easily by evaporation during drying. The carboxylic acid salt of the formula (4) is obtainable as an aqueous solution by adding the corresponding carboxylic acid to water, followed by neutralization with an excess amount of e.g. aqueous ammonia. Each of such corresponding carboxylic acids has a pKa of at least 4.1, preferably from 4.1 to 6. Specific examples of the carboxylic acid salt of the formula (4) include ammonium laurate (lauric acid has a carbon number of 12, and pKa of 4.6), ethanolamine laurate, ammonium cinnamate (cinnamic acid has a carbon number of 9, and pKa of 4.4), ammonium p-t-butyl benzoate (p-t-butyl benzoic acid has a carbon number of 11, and a pKa of 4.4), ammonium fluorophenyl acetate (fluorophenyl acetic acid has a carbon number of 8, and a pKa of 4.3) or ammonium p-fluorobenzoate (p-fluorobenzoic acid has a carbon number of 7, and a pKa of 4.14).

Further, another example of the compound of the formula (4) is carboxylic acids (hereinafter referred to also as natural coconut oil fatty acids or palm oil fatty acids) obtainable by hydrolysis of natural oils such as natural coconut oil, palm oil or palm kernel oil or ammonium salts or triethanol amine salts as their purified products. In such a case, because the product is a mixture of carboxylic acids, the precipitation hardly takes place even when the pH is changed, and also such a product can be obtained at a relatively low cost, such being preferred.

Since the carboxylic acid salt of the formula (4) is thermally decomposable, it does not cause coloration of the product during baking the aqueous PTFE dispersion at around 380° C. and does not form ionic impurities, and thereby improves the quality of the product.

The carboxylic acid salt of the formula (4) is added in an amount of from 0.001 to 0.10 mass %, preferably from 0.005 to 0.08 mass %, particularly preferably from 0.01 to 0.05 mass %, based on the mass of PTFE. If the amount is less than 0.001 mass %, improvement in concentration efficiency and friction stability are not attained, and if such an amount is higher than 0.10 mass %, the aqueous PTFE dispersion is too viscous to form coatings with controlled thicknesses.

In the process for producing an aqueous PTFE dispersion, dissolution of the carboxylic acid salt of the formula (4) is followed by concentration of the low concentration aqueous PTFE dispersion. Various concentration processes are available for the concentration.

As the concentration processes, centrifugal sedimentation, electrophoresis, phase separation and other known methods are, for example, available, as disclosed in Handbook of Fluorine resins, p. 32 (edited by Takaomi Satokawa, published by Nikkankogyo Shimbun).

At the time of the concentration, the pH of the aqueous PTFE dispersion is preferably at least 6, more preferably from 7 to 12, particularly preferably from 7 to 10.

During the concentration, part of PFCA is removed with the supernatant. It is advantageous to add the carboxylic acid salt of the formula (4) before the concentration, since more of PFCA transfers to the supernatant and is removed with the supernatant.

Though part of the carboxylic acid salt of the formula (4) added before the concentration is removed with the supernatant during the concentration, most of it is adsorbed by PTFE fine particles and remains in the high concentration aqueous PTFE dispersion obtained as the sediment layer.

The high concentration aqueous PTFE dispersion obtained after the concentration has a PTFE concentration of from 60 to 75 mass %, preferably from 63 to 72 mass %, particularly preferably from 65 to 70 mass %. If the PTFE concentration is higher than 75 mass %, the PTFE fine particles tend to partly agglomerate, and the product yield tends to be low. If the PTFE concentration is lower than 60 mass %, the viscosity of the aqueous PTFE dispersion tends to be too low to be coated, and the storage stability tends to be problematically poor.

The aqueous PTFE dispersion of the present invention may be the high concentration aqueous PTFE dispersion itself, or may be obtained by diluting the high concentration aqueous PTFE dispersion with water or by adding, for improvement of stability and optimization of viscosity and wettability, additional nonionic surfactants, anionic surfactants, various other known ingredients such as leveling agents, antiseptic agents, coloring agents, fillers or organic solvents, as the case requires.

Especially, use of a viscosity modifier of polyethylene oxide or polyurethane type is preferable because the friction stability improves further. As the viscosity modifier, those disclosed in JP-A-2000-198899 are preferred. A viscosity modifier is usually added in an amount of preferably from 0.01 to 1 mass %, more preferably from 0.1 to 0.5 mass %, based on the mass of PTFE.

Thus, the aqueous PTFE dispersion of the present invention is obtained from the high concentration aqueous PTFE dispersion.

The aqueous PTFE dispersion of the present invention has a PTFE concentration of from 55 to 70 mass %, more preferably from 58 to 68 mass %, particularly preferably from 60 to 65 mass %. If the PTFE concentration is higher than 70 mass %, the viscosity tends to be too high, and if the PTFE concentration is lower than 55 mass %, the PTFE fine particles tend to sediment, and the storage stability tends to be poor.

The aqueous PTFE dispersion of the present invention contains the nonionic surfactant at a concentration of preferably from 1 to 20 mass %, more preferably from 2.0 to 12 mass %, particularly preferably from 3.0 to 10.0 mass % based on the mass of PTFE. If it is higher than 20 mass %, the viscosity tends to be too high, and if it is less than 1 mass %, the PTFE fine particles tend to sediment, the storage stability tends to be poor, and also the coating wettability tends to be poor.

The PFCA content in the aqueous PTFE dispersion of the present invention is from 0.0001 to 0.02 mass %, preferably from 0.001 to 0.01 mass %, particularly preferably from 0.002 to 0.005 mass %, based on the mass of PTFE. It is industrially difficult to attain a PFCA concentration lower than 0.0001 mass %, and it is undesirable that the PFCA concentration is higher than 0.02 mass %, in view of environmental influences.

The carboxylic acid salt of the formula (4) in the aqueous PTFE dispersion of the present invention has a concentration of from 0.001 to 0.10 mass %, preferably from 0.005 to 0.08 mass %, particularly preferably from 0.01 to 0.05 mass % based on the mass of PTFE. If it is less than 0.001 mass %, improvement in friction stability can hardly be attained, and if it is higher than 0.10 mass %, the aqueous PTFE dispersion tends to be too viscous to form coatings with controlled thicknesses.

The pH of the aqueous PTFE dispersion of the present invention is from 7 to 12, preferably from 8 to 11, particularly preferably from 8.5 to 10.5. For pH adjustment, it is preferred to dissolve a sufficient amount of an alkaline substance such as ammonia which can be removed by baking. At a pH lower than 7, the carboxylic acid salt of the formula (4) can be instable and precipitate. It is not preferred that the pH is higher than 12, because the smell of ammonia or the like is strong, and the dispersion has much influence on the human body when it is in contact with the skin.

The carboxylic acid salt in the aqueous PTFE dispersion of the present invention can improve friction stability of the aqueous PTFE dispersion, although the mechanism is not clearly understood. It is unlikely to form agglomerates which clog pumps during pumping the aqueous PTFE dispersion, and is unlikely to agglomerate in frictionized areas during coating.

EXAMPLES

Now, the present invention will be described in further detail with reference to Examples and Comparative Examples, but it should be understood that the present invention is by no means restricted thereto.

Examples 1 to 5 and Example 11 are Working Examples of the present invention, and Examples 6 to 10 are Comparative Examples.

The evaluation methods for the respective items are as follows.

(A) The average molecular weight of PTFE: It was obtained from a latent heat measured by differential calorimetry in accordance with the method by Suwa et al. (described in J. Appl. Polym. Sci, 17, 3253 (1973)).

(B) The average particle diameter of PTFE: An aqueous PTFE dispersion was dried and then photographed at 10,000-fold magnification by using a scanning electron microscope, and the average value was obtained.

(C) PTFE concentration and surfactant concentration: Approximately 10 g of a dispersion sample was put in an aluminum dish with a known weight, and the weight after dehydration at 120° C. for 1 hour and the weight after thermal decomposition of the surfactant at 380° C. for 35 minutes, were obtained, and the PTFE concentration and the surfactant concentration based on the mass of PTFE were calculated. In the present invention, the surfactant concentration represents a numerical value including PFCA.

(D) PFCA concentration, carboxylic acid salt concentration and an anionic surfactant concentration: PFCA aqueous solutions, aqueous solutions of carboxylic acid salts or anionic surfactants having known concentrations were analyzed by LCMS (high performance liquid chromatography-mass spectrometry), and peak areas were plotted to make calibration curves. Then, 50 g of a low or high concentration aqueous PTFE dispersion was dried at 70° C. for 16 hours, and was extracted with ethanol, and from the LCMS peak areas of the extract, the PFCA concentration, the carboxylic acid salt concentration and the anionic surfactant concentration in the sample were determined by using the calibration curves.

(E) pH: It was measured by the glass electrode method.

(F) Viscosity: Measured by a Brookfield viscometer using a spindle No. 1 at 60 rpm.

(G) Friction stability: A TYGON tube having an outer diameter of 7.9 mm and an inner diameter of 4.8 mm was mounted on a tubular pump manufactured by Cole-Palmer, and both ends of the tube were put in a 200 cc beaker filled with 100 cc of an aqueous PTFE dispersion. The opening was covered with an aluminum foil to prevent evaporation of the dispersion. Using the resulting apparatus, the aqueous PTFE dispersion was circulated at a room temperature of 23° C. at a feed rate of 200 cc/min for 1 hour. After the circulation, the dispersion was filtered through a 200-mesh nylon filter to collect agglomerates. The agglomerates were dried at 120° C. for 1 hour and then weighed. When the amount of agglomerates was 1 g or below, the friction stability was judged to be good, and when it was above 2 g, the friction stability was judged to be poor.

(H) Coating test and colorimetry: A glass fiber cloth weighing 80 g per 1 $m^2$ was cut into a size of 10 cm×5 cm and baked at 400° C. for 1 hour. Then, the glass fiber cloth was dipped in an aqueous PTFE dispersion in a beaker and withdrawn as coated with the dispersion. It was dried at 120° C. for 10 minutes and baked at 380° C. The cloth was further coated with the aqueous PTFE dispersion, dried and baked repeatedly 6 times to obtain a PTFE-coated glass fiber cloth. The hues L*, a* and b* after being coated were measured by an SM color computer manufactured by Suga Test Instruments, and changes in the hues $\Delta L^*$, $\Delta a^*$ and $\Delta b^*$ were calculated by subtracting the hues L0*, a0* and b0* of the glass fiber cloth before being coated. When the indicator of yellowing, $\Delta b^*$, was less than 3, the dispersion was rated to be good, and when it was 3 or more, the dispersion was rated to be bad. When cracks were observed in the coating, the dispersion was rated to be bad.

(I) Electric conductivity: The PTFE-coated glass fiber cloth used for colorimetry was immersed in 10 times by mass of distilled water for a week, and the electric conductivity of the water was measured by a conductivity tester manufactured by Lacom. A conductivity of less than 1 μS indicates little dissolution of ionic components and was judged to be good, and a conductivity above 1 μS was judged to be bad.

The additives (a) to (i) used in the Examples are those marked with the corresponding symbols in Tables 1 and 2. The chemical structures of the additives are shown in Table 3.

Example 1

Emulsion polymerization was carried out in the presence of ammonium perfluorooctanoate as PFCA preliminary added in an amount of 0.25 mass % based on the mass of PTFE to obtain an aqueous PTFE polymer emulsion having a PTFE concentration of 29 mass %, an average particle diameter of 0.25 μm and an average molecular weight of about 3,000,000.

The nonionic surfactant (a) was dissolved in an amount of 5 mass % based on the mass of PTFE to the aqueous PTFE polymer emulsion, and the emulsion was stirred with 2 mass %, based on the mass of PTFE, of a strong basic anion exchange resin, DIAION (registered trademark) HPA-25 manufactured by Mitsubishi Chemical Corporation, for 24 hours to lower the PFCA concentration. Then, the anion exchange resin was removed by filtration through a 200-mesh nylon filter. Then, 0.3 mass %, based on the mass of PTFE, of an aqueous solution of ammonium laurate (one obtained as an aqueous solution, by adding 200 g of lauric acid and 120 g of 28 mass % aqueous ammonia to 1,680 g of water) (which corresponds to 0.03 mass %, based on the mass of PTFE, of ammonium laurate), as the carboxylic acid salt (d), was added to obtain a low concentration aqueous PTFE dispersion having a PFCA concentration of 0.0067 mass % based on the mass of PTFE.

This low concentration aqueous PTFE dispersion was electrophoretically concentrated over 30 hours to obtain a high concentration aqueous dispersion having a PTFE concentration of about 67.2 mass %, a surfactant concentration of 2.3 mass % based on the mass of PTFE and a PFCA concentration of 0.0032 mass % based on the mass of PTFE.

To the high concentration aqueous PTFE dispersion, 2.6 mass %, based on the mass of PTFE, of the nonionic surfactant (a), 0.05 mass %, based on the mass of PTFE, of 28 mass % aqueous ammonia and water were added to obtain an aqueous PTFE dispersion having a PTFE concentration of about 60.5 mass %.

The friction stability of the aqueous PTFE dispersion obtained was good, and the results of the coating test on a glass fiber cloth and the elution test were good with little coloration and little elution of impurities.

Example 2

The procedure in Example 1 was followed except that (b) was used as a nonionic surfactant, and (e) was used as a carboxylic acid salt to obtain an aqueous PTFE dispersion.

Example 3

The procedure in Example 1 was followed except that (c) was used as a nonionic surfactant, and (f) was used as a carboxylic acid salt.

Example 4

To the aqueous PTFE polymer emulsion used in Example 1, 15 mass %, based on the mass of PTFE, of the nonionic surfactant (a) was dissolved, and the emulsion was stirred with 2.5 mass %, based on the mass of PTFE, of a weak basic anion exchange resin, DIAION (registered trademark) WA-30 manufactured by Mitsubishi Chemical Corporation, for 24 hours to lower the PFCA concentration. Then, the anion exchange resin was removed by filtration through a 200-mesh nylon filter. Further, 0.02 mass %, based on the mass of PTFE, of carboxylic acid salt (d) was added thereto to obtain a low concentration aqueous PTFE dispersion having a PFCA concentration of 0.0066 mass % based on the mass of PTFE.

This low concentration aqueous PTFE dispersion was left to stand in a 10 L vessel at 80° C. overnight and concentrated by phase separation for 24 hours to obtain a high concentration aqueous PTFE dispersion having a PTFE concentration of about 68.3 mass %, a surfactant concentration of 3.2 mass % based on the mass of PTFE and a PFCA concentration of 0.0027 mass % based on the mass of PTFE.

To the high concentration aqueous PTFE dispersion, 2.6 mass %, based on the mass of PTFE, of the nonionic surfactant (a), 0.05 mass %, based on the mass of PTFE, of 28 mass % aqueous ammonia and water were added to obtain an aqueous PTFE dispersion.

Example 5

The procedure in Example 4 was followed except that (g) was used as a carboxylic acid salt and blending of the nonionic surfactant was changed to obtain an aqueous PTFE dispersion.

Example 6

The procedure in Example 1 was followed except that no carboxylic acid salt was used. However, the PTFE concentration in the resulting high concentration aqueous PTFE dispersion was as low as 58.5 mass %. Further, the friction stability of the aqueous PTFE dispersion obtained by adding a nonionic surfactant and ammonia, was poor, such being undesirable.

Example 7

The procedure in Example 1 was followed except that (h) as a sulfur-containing anionic surfactant was added in an amount of 0.05 mass % based on the mass of PTFE to obtain an aqueous PTFE dispersion. A coating test was carried out with this aqueous PTFE dispersion, and the resulting coated-cloth sample was colored brown and the electric conductivity which indicates an amount of ionic impurities was high, such being undesirable.

Example 8

The procedure in Example 1 was followed except that (d) as a carboxylic acid salt was added in an amount of 0.13 mass % based on the mass of PTFE to obtain an aqueous PTFE dispersion. The resulting aqueous PTFE dispersion had a remarkably high viscosity, the PTFE pick up during a coating test was large, and cracking occurred, such being undesirable.

Example 9

The procedure in Example 4 was followed except that no carboxylic acid salt was used. The resulting high concentration aqueous PTFE dispersion had a PTFE concentration as low as 55.3 mass %. Further, the aqueous PTFE dispersion obtained by adding a nonionic surfactant and ammonia had a poor friction stability, such being undesirable.

Example 10

The procedure in Example 4 was followed except that (i) as a sulfur-containing anionic surfactant was added in an amount 0.05 mass % based on the mass of PTFE to obtain an aqueous PTFE dispersion. A coating test was carried out with this aqueous PTFE dispersion, and the resulting coated-sample was colored brown, and the electric conductivity was large, such being undesirable.

Example 11

To 100 g of natural coconut oil fatty acid (number-average carbon number $R^4$ is 11.2, a mixture of 8% of caprilic acid, 7% of capric acid, 48% of lauric acid, 18% of myristic acid, 9% of palmitic acid, 3% of stearic acid, 6% of oleic acid and 1% of linolic acid; trade name is Lunac L-50 manufactured by Kao Corporation), 55 g of 28 mass % aqueous ammonia and water were added to prepare an aqueous ammonium natural coconut oil fatty acid solution having a concentration of 10% and a pH of 10.2. The procedure in Example 1 was followed except that instead of an aqueous ammonium laurate solution, the aqueous ammonium natural coconut oil fatty acid solution was added in an amount of 0.3 mass % based on the mass of PTFE to obtain a high concentration aqueous PTFE dispersion having a PTFE concentration of 66.2%, a surfactant concentration of 2.2% based on the mass of PTFE and a pH of 9.0. To the high concentration aqueous PTFE dispersion, 2.8 mass %, based on the mass of PTFE, of the nonionic surfactant (a), 0.05 mass %, based on the mass of PTFE, of 28 mass % aqueous ammonia, and water were added to obtain an aqueous PTFE dispersion having an PTFE concentration of about 60.6 mass %.

The friction stability of the resulting aqueous PTFE dispersion was good, and the results of the coating test on a glass fiber cloth and the elution test were good with little coloration and little elution of impurities.

TABLE 1

| Item | | Example 1 | Example 2 | Example 3 | Example 4 | Example 5 | Example 11 |
|---|---|---|---|---|---|---|---|
| Aqueous PTFE polymer emulsion | PTFE concentration (mass %) | 29 | 29 | 29 | 29 | 29 | 29 |
| | PFCA concentration (mass %/PTFE) | 0.25 | 0.25 | 0.25 | 0.25 | 0.25 | 0.25 |
| Nonionic surfactant added to aqueous PTFE polymer emulsion and the amount thereof (mass %/PTFE) | | (a) 5 | (b) 5 | (c) 5 | (a) 15 | (a) 15 | (a) 5 |
| Removal of PFCA and PFCA concentration after the removal | Method | Ion exchange | Ion exchange | Ion exchange | Ion exchange | Ion exchange | Ion exchange |
| | PFCA concentration (mass %/PTFE) | 0.0067 | 0.0064 | 0.0069 | 0.0066 | 0.0066 | 0.0067 |
| Carboxylic acid and the amount thereof (mass %/PTFE) | | (d) 0.03 | (e) 0.03 | (f) 0.03 | (d) 0.02 | (g) 0.05 | (j) 0.03 |
| Concentration procedure and the concentration of the resulting high concentration aqueous PTFE dispersion | Method | Electrophoresis | Electrophoresis | Electrophoresis | Phase separation | Phase separation | Electrophoresis |
| | PTFE concentration (mass %) | 67.2 | 67.1 | 67.3 | 68.3 | 66.9 | 66.2 |
| | Surfactant concentration (mass %/PTFE) | 2.3 | 2.3 | 2.3 | 3.2 | 3.2 | 2.2 |
| | pH | 8.6 | 8.3 | 7.8 | 8.6 | 7.4 | 9.0 |
| Nonionic surfactant added after concentration, and the amount thereof (mass %/PTFE) | | (a) 2.6 | (b) 2.6 | (c) 2.6 | (a) 2.6 | (c) 5.8 | (a) 2.8 |
| Properties of aqueous | PTFE concentration | 60.5 | 60.5 | 60.4 | 65.0 | 55.2 | 60.6 |

TABLE 1-continued

| | Item | Example 1 | Example 2 | Example 3 | Example 4 | Example 5 | Example 11 |
|---|---|---|---|---|---|---|---|
| PTFE dispersion after blending | (mass %) Surfactant concentration (mass %/PTFE) | 4.9 | 4.9 | 4.9 | 5.8 | 9.0 | 5.0 |
| | PFCA concentration (mass %/PTFE) | 0.0032 | 0.0030 | 0.0041 | 0.0027 | 0.0026 | 0.0031 |
| | Carboxylic acid salt concentration (mass %/PTFE) | 0.025 | 0.028 | 0.026 | 0.018 | 0.046 | 0.026 |
| | Viscosity at 23° C. (mPa · s) | 21 | 20 | 20 | 32 | 19 | 20 |
| | pH | 9.2 | 9.2 | 9.1 | 9.3 | 9.2 | 9.3 |
| | Agglomerates generated upon friction stability test (g) | 0.67 | 0.71 | 0.62 | 0.60 | 0.58 | 0.65 |
| Coating test on glass fiber cloth | Appearance | White | White | White | White | White | White |
| | $\Delta L^*$ | −2.12 | −1.56 | −4.38 | −2.55 | −1.54 | −2.06 |
| | $\Delta a^*$ | 0.06 | 0.09 | 0.14 | 0.16 | 0.11 | 0.12 |
| | $\Delta b^*$ | 0.28 | 0.32 | 0.94 | 0.34 | 0.02 | 0.35 |
| Electrical conductivity after elution test (µS) | | <1 | <1 | <1 | <1 | <1 | <1 |
| Evaluation | | Good | Good | Good | Good | Good | Good |

TABLE 2

| | Item | Example 6 | Example 7 | Example 8 | Example 9 | Example 10 |
|---|---|---|---|---|---|---|
| Aqueous PTFE polymer emulsion | PTFE concentration (mass %) | 29 | 29 | 29 | 29 | 29 |
| | PFCA concentration (mass %/PTFE) | 0.25 | 0.25 | 0.25 | 0.25 | 0.25 |
| Addition to aqueous PTFE dispersion | Nonionic surfactant and the amount thereof | (a) 5 | (a) 5 | (a) 5 | (a) 15 | (a) 15 |
| Removal of PFCA and PFCA concentration after the removal | Method | Ion exchange | Ion exchange | Ion exchange | Ion exchange | Ion exchange |
| | PFCA concentration (mass %/PTFE) | 0.0067 | 0.0067 | 0.0067 | 0.0066 | 0.0066 |
| Carboxylic acid salt or anionic surfactant added before concentration, and the amount thereof (mass %/PTFE) | | Nil | (h) 0.05 | (d) 0.13 | Nil | (i) 0.05 |
| Concentration procedure and the concentration of the high concentration aqueous PTFE dispersion | Method | Electrophoresis | Electrophoresis | Electrophoresis | Phase separation | Phase separation |
| | PTFE concentration (mass %) | 58.5 | 66.2 | 66.5 | 55.3 | 66.6 |
| | Surfactant concentration (mass %/PTFE) | 2.6 | 2.4 | 2.3 | 4.2 | 3.2 |
| | pH | 3.3 | 3.5 | 8.9 | 9.0 | 8.7 |
| Nonionic surfactant added after concentration, and the amount thereof (mass %/PTFE) | | (a) 2.6 | (a) 2.6 | (a) 2.6 | (a) 2.6 | (a) 2.6 |
| Properties of aqueous PTFE dispersion after blending | PTFE concentration (mass %) | 57.6 | 60.5 | 60.4 | 54.5 | 60.2 |
| | Surfactant concentration (mass %/PTFE) | 5.2 | 5.0 | 4.9 | 6.8 | 5.8 |
| | PFCA concentration (mass %/PTFE) | 0.0062 | 0.0056 | 0.0032 | 0.0063 | 0.0052 |
| | Carboxylic acid salt concentration or anionic surfactant concentration (mass %/PTFE) | 0 | 0.045 | 0.12 | 0 | 0.044 |
| | Viscosity at 23° C. (mPa · s) | 16 | 19 | 140 | 16 | 19 |

TABLE 2-continued

| | Item | Example 6 | Example 7 | Example 8 | Example 9 | Example 10 |
|---|---|---|---|---|---|---|
| | pH | 9.3 | 9.2 | 9.3 | 9.3 | 9.2 |
| | Agglomerates generated after friction stability test (g) | 3.67 | 0.77 | 0.54 | 4.20 | 0.81 |
| Coating test on glass fiber cloth | Appearance | White | Dark brown | White | White | Dark brown |
| | L* | −1.58 | −9.46 | −1.42 | −1.57 | −11.48 |
| | a* | 0.12 | 2.54 | 0.16 | 0.05 | 2.82 |
| | b* | 0.36 | 5.42 | 0.25 | 0.42 | 5.46 |
| Electrical conductivity after elution test (µS) | | <1 | 12 | <1 | <1 | 8 |
| Evaluation | | *1 | *2 | *3 | *1 | *2 |

*1 No good in concentration efficiency and friction stability
*2 No good in appearance after coating and electric conductivity
*3 No good because of high viscosity and cracking during a coating test

TABLE 3

| No. | Structural formula of additives | Molecular weight | pKa |
|---|---|---|---|
| (a) | $C_{12}H_{25}$—O—$(C_2H_4O)_9$—OH | 598 | — |
| (b) | $C_{13}H_{27}$—O—$(C_2H_4O)_8$—CH($CH_3$)$CH_2$—OH | 610 | — |
| (c) | C($CH_3$)$_3CH_2$C($CH_3$)$_2$($C_6H_4$)—(O$C_2H_4$)$_{10}$—OH | 646 | — |
| (d) | $C_{11}H_{23}$—COON$H_4$ | 217 | 4.6 |
| (e) | $C_6H_{13}$—COON$H_3C_2H_4$OH | 191 | 4.4 |
| (f) | F—($C_6H_4$)—$CH_2$—COON$H_4$ | 171 | 4.3 |
| (g) | $CH_3$C($CH_3$)$_2$($C_6H_4$)—COON$H_4$ | 195 | 4.4 |
| (h) | $C_{12}H_{25}$—$SO_3$Na | 272 | <3 |
| (i) | $C_{12}H_{25}$—$SO_3$N$H_4$ | 267 | <3 |
| (j) | $C_{11.2}H_{23.4}$—COON$H_4$ (Carbon number is average value) | 219.8 | 4.6 |

The aqueous dispersion of PTFE of the present invention has many uses for electronic materials such as printed circuit boards, roofing materials for membranous buildings and surface coatings for cooking utensils, and as PTFE fibers after spinning, dust prevention use, binders for active materials in batteries and additives for plastics.

The entire disclosure of Japanese Patent Application No. 2005-165054 filed on Jun. 6, 2005 including specification, claims and summary is incorporated herein by reference in its entirety.

What is claimed is:

1. An aqueous dispersion of polytetrafluoroethylene comprising:
   from 55 to 70 mass % of polytetrafluoroethylene fine particles having an average particle diameter of from 0.1 to 0.5 µm,
   from 0.0001 to 0.02 mass %, based on the mass of polytetrafluoroethylene, of a fluorine-containing carboxylic acid salt represented by the formula (1),
   from 1 to 20 mass %, based on the mass of polytetrafluoroethylene, of a nonionic surfactant represented by the formula (2) and/or the formula (3), and
   from 0.001 to 0.10 mass %, based on the mass of polytetrafluoroethylene, of a carboxylic acid salt represented by the formula (4);
   wherein formulas (1)-(4) are as follows:
   formula (1):
   $R^1$—COOX (wherein $R^1$ is a $C_{5-9}$ alkyl group having fluorine atoms substituted for from 90 to 100% of the hydrogen atoms (which may contain from 1 to 2 etheric oxygen atoms), and X is an ammonium ion);
   formula (2): $R^2$—O-A-H (wherein $R^2$ is a $C_{8-18}$ alkyl group, and A is a polyoxyalkylene chain consisting of from 5 to 20 oxyethylene groups and from 0 to 2 oxypropylene groups);
   formula (3): $R^3$—$C_6H_4$—O—B—H (wherein $R^3$ is a $C_{4-12}$ alkyl group, and B is a polyoxyethylene chain consisting of from 5 to 20 oxyethylene groups); and
   formula (4): $R^4$—COOY (wherein $R^4$ is a $C_{6-16}$ alkyl group, alkenyl group or aryl group having fluorine atoms substituted for at most 20% of the hydrogen atoms, and Y is a cationic group represented by the formula {HO($CH_2$)$_n$}$_x$N$^+$H$_{4-x}$ wherein n is an integer of from 2 to 4, and x is an integer of from 0 to 4).

2. The aqueous dispersion of polytetrafluoroethylene according to claim 1, wherein
   the fluorine-containing carboxylic acid salt represented by the formula (1) is contained in an amount of from 0.001 to 0.02 mass %, based on the mass of polytetrafluoroethylene,
   the nonionic surfactant represented by the formula (2) and/or the formula (3) is contained in an amount of from 2 to 12 mass %, based on the mass of polytetrafluoroethylene, and
   the carboxylic acid salt represented by the formula (4) is contained in an amount of from 0.005 to 0.08 mass %, based on the mass of polytetrafluoroethylene.

3. The aqueous dispersion of polytetrafluoroethylene according to claim 1, wherein the fluorine-containing carboxylic acid salt represented by the formula (1) is at least one member selected from the group consisting of $C_7F_{15}$COON$H_4$, HC$_7F_{14}$COON$H_4$, $C_6F_{13}$COON$H_4$, HC$_6F_{12}$COON$H_4$, $C_8F_{17}$COON$H_4$, $C_4F_9$OC$_2F_4$OCF$_2$COON$H_4$ and $C_2F_5$OC$_2F_4$OCF$_2$COON$H_4$.

4. The aqueous dispersion of polytetrafluoroethylene according to claim 1, wherein in the nonionic surfactant represented by the formula (2), $R^2$ is a $C_{10-16}$ alkyl group, and A has from 7 to 12 oxyethylene groups.

5. The aqueous dispersion of polytetrafluoroethylene according to claim 1, wherein in the nonionic surfactant represented by the formula (3), $R^3$ is a $C_{6-10}$ alkyl group, and B has from 6 to 16 oxyethylene groups.

6. The aqueous dispersion of polytetrafluoroethylene according to claim 1, wherein a carboxylic acid represented by $R^4$—COOH which corresponds to the carboxylic acid salt represented by the formula (4) has a pKa of from 4.1 to 6.

7. The aqueous dispersion of polytetrafluoroethylene according to claim 1, wherein the carboxylic acid salt represented by the formula (4) is at least one member selected from the group consisting of ammonium laurate, ethanolamine laurate, ammonium cinnamate, ammonium p-t-butyl benzoate, ammonium fluorophenyl acetate, ammonium p-fluorobenzoate and ammonium natural coconut oil fatty acid.

8. The aqueous dispersion of polytetrafluoroethylene according to claim 1, wherein the polytetrafluoroethylene fine particles having an average particle diameter of from 0.1 to 0.5 μm are contained in an amount of from 58 to 68 mass %.

9. The aqueous dispersion of polytetrafluoroethylene according to claim 1, wherein the fluorine-containing carboxylic acid salt represented by the formula (1) is $C_7F_{15}COONH_4$.

10. The aqueous dispersion of polytetrafluoroethylene of claim 1 that is produced by a process comprising:

dissolving from 0.001 to 0.10 mass %, based on the mass of polytetrafluoroethylene, of a carboxylic acid salt represented by the formula (4) in a low concentration aqueous dispersion of polytetrafluoroethylene comprising from 1 to 40 mass % of polytetrafluoroethylene fine particles having an average particle size of from 0.1 to 0.5 μm, from 0.000 1 to 0.02 mass %, based on the mass of polytetrafluoroethylene, of a fluorine-containing carboxylic acid salt represented by the formula (1), and from 1 to 20 mass %, based on the mass of polytetrafluoroethylene, of a nonionic surfactant represented by the formula (2) and/or the formula (3), and then concentrating the low concentration aqueous dispersion of polytetrafluoroethylene to give a high concentration aqueous dispersion of polytetrafluoroethylene containing polytetrafluoroethylene at a concentration of from 60 to 75 mass %.

* * * * *